US007885999B2

(12) United States Patent
St Marie

(10) Patent No.: US 7,885,999 B2
(45) Date of Patent: Feb. 8, 2011

(54) METHODS AND SYSTEMS FOR DEVICE PERSONALIZATION

(75) Inventor: Jesse St Marie, 147 Oakdale Rd., Newton, MA (US) 02461

(73) Assignee: Jesse St Marie, Newton, MA (US)

(\*) Notice: Subject to any disclaimer, the term of this patent is extended or adjusted under 35 U.S.C. 154(b) by 175 days.

(21) Appl. No.: 12/163,954

(22) Filed: Jun. 27, 2008

(65) Prior Publication Data

US 2009/0013060 A1     Jan. 8, 2009

Related U.S. Application Data

(60) Provisional application No. 60/948,076, filed on Jul. 5, 2007.

(51) Int. Cl.
*G06F 15/16*     (2006.01)

(52) U.S. Cl. .................. 709/203; 709/219; 709/221; 709/222; 709/228; 709/246; 726/24; 726/35

(58) Field of Classification Search ............... 709/203, 709/219, 221, 222, 228, 246
See application file for complete search history.

(56) References Cited

U.S. PATENT DOCUMENTS 7,016,669 B2\*   3/2006  Aerrabotu et al. ........... 455/419
7,302,585 B1\*   11/2007 Proudler et al. ............. 713/189
2003/0087627 A1\*  5/2003 Cannon ..................... 455/404
2003/0097596 A1\*  5/2003 Muratov et al. ............. 713/202
2004/0192281 A1\*  9/2004 Aerrabotu et al. ........... 455/419
2005/0242167 A1\* 11/2005 Kaario et al. ............... 235/375
2006/0095290 A1\*  5/2006 Chernev .................... 705/1
2006/0095291 A1\*  5/2006 Cherney .................... 705/1
2007/0016676 A1\*  1/2007 Breuer et al. ............... 709/225
2008/0288579 A1\* 11/2008 Pozarycki .................. 709/203
2009/0013060 A1\*  1/2009 St Marie .................... 709/217
2009/0163175 A1\*  6/2009 Shi et al. ................... 455/411
2009/0228991 A1\*  9/2009 Schneider et al. ........... 726/34

\* cited by examiner

*Primary Examiner*—Michael Won
(74) *Attorney, Agent, or Firm*—Seed IP Law Group PLLC; Ellen Biermon

(57) ABSTRACT

Systems and methods for personalizing devices using data objects in a manner that deters theft and provides a mechanism for finding lost devices are described. In one embodiment, one of the methods includes uniquely registering a device and an owner of the device with the system. The method further includes personalizing the registered device to include lost and found information, such as by creating an image data object to include the information or providing a text data object that includes the information. In another method, a lost and found tracking service is used to receive a report of a found device from a finder and to determine an associated owner of the found device in order to contact the owner and convey information regarding the finder.

16 Claims, 4 Drawing Sheets

METHODS AND SYSTEMS FOR DEVICE PERSONALIZATION

CROSS-REFERENCE TO RELATED APPLICATION

This application claims the benefit of U.S. Provisional Application No. 60/948,076 filed on Jul. 5, 2007 titled METHODS AND SYSTEMS FOR DEVICE PERSONALIZATION

TECHNICAL FIELD

The present disclosure relates to methods, systems and techniques for personalizing devices, and in particular, to methods, systems, and techniques for personalization of electronic devices using images in a manner that deters theft and provides a mechanism for finding lost devices.

BACKGROUND

Personalization of an electronic device involves a personalization mechanism that makes the devices safe to unwanted access and easy to track if, in case, it gets lost. Conventional mechanisms for personalizing a device use various physical identification tags and labels, such as identification stickers, affixed to a device for the purpose of tracking the device if the device gets lost or is stolen by someone. These physical identification mechanisms are easily available to users of such devices through vendors that provide such tags having a tracking identifier ("ID"). However, the tags tend to be expensive, and can easily fall off the device or can be taken off the device by anybody.

Other methods of device tracking that are in use include online tracking services, which enable a person to track a device whose physical label ID has been registered with the services. However, if the physical label ID on the device is no longer available for any reason, the device can not be tracked.

Moreover, existing online tracking services match the descriptive information of a lost device with stored descriptive information of various devices to return the lost device back to the owner. The descriptive information of devices is given by their respective owners while registering the devices with the services. This process of matching information may be laborious and time consuming for a finder of the lost device. This is because, to track the device and to determine the real owner of the device, the finder needs to compare information of all probable matching devices with that of the lost device.

SUMMARY

This summary is provided to introduce methods, systems, and techniques for personalizing devices and, in particular, to methods, systems, and techniques for personalization of electronic devices using images in a manner that deters theft and provides a mechanism for finding lost devices, which is further described below in detailed description. This summary is not intended to identify essential features of the claimed subject matter, nor is it intended for use in determining the scope of the claimed subject matter.

In one embodiment, one of the methods includes uniquely registering a device and an owner of the device with the system. The method further includes personalizing the registered device to include lost and found information, such as by creating an image data object to include the information or providing a text data object that includes the information. The image data object or the text data object is displayed on the registered device and can be used for identifying the registered device. In another method, a lost and found tracking service is used to receive a report of a found device from a finder and to determine an associated owner of the found device in order to contact the owner and convey information regarding the finder.

BRIEF DESCRIPTION OF THE FIGURES

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The following disclosure describes systems and methods for enhanced computer and network-based methods and systems for personalizing electronic devices, particularly portable devices, with downloaded images or data objects that provide lost and found information. Such methods, systems, and techniques may be used to provide an identification ("ID") for a device so as to deter theft and may be used in conjunction with services, such as a lost and found registry or a tracking service.

In an exemplary embodiment, an Image Personalization System and Service (IPSS) is provided as a lost and found registry and tracking service, which enables users to download a personalized image with embedded tracking information onto a designated device. The personalized image is optionally downloaded in a manner that prevents the image's removal without authorization. Further, the device and the owner of the device are registered with a service component of the IPSS. The IPSS provides for automatically tracking and notifying the owner in response to receiving a report from a finder of the device.

The systems, and techniques associated with the IPSS permit a device to be tracked even if it is stolen, as the identification information cannot easily be removed illicitly. In addition, the identification mechanism provided by an IPSS is less expensive to obtain and can be incorporated potentially faster than a physical labeling mechanism. Further, the IPSS identification mechanism provides users with some degree of individuation and creativity.

Exemplary Systems

Figure 1:
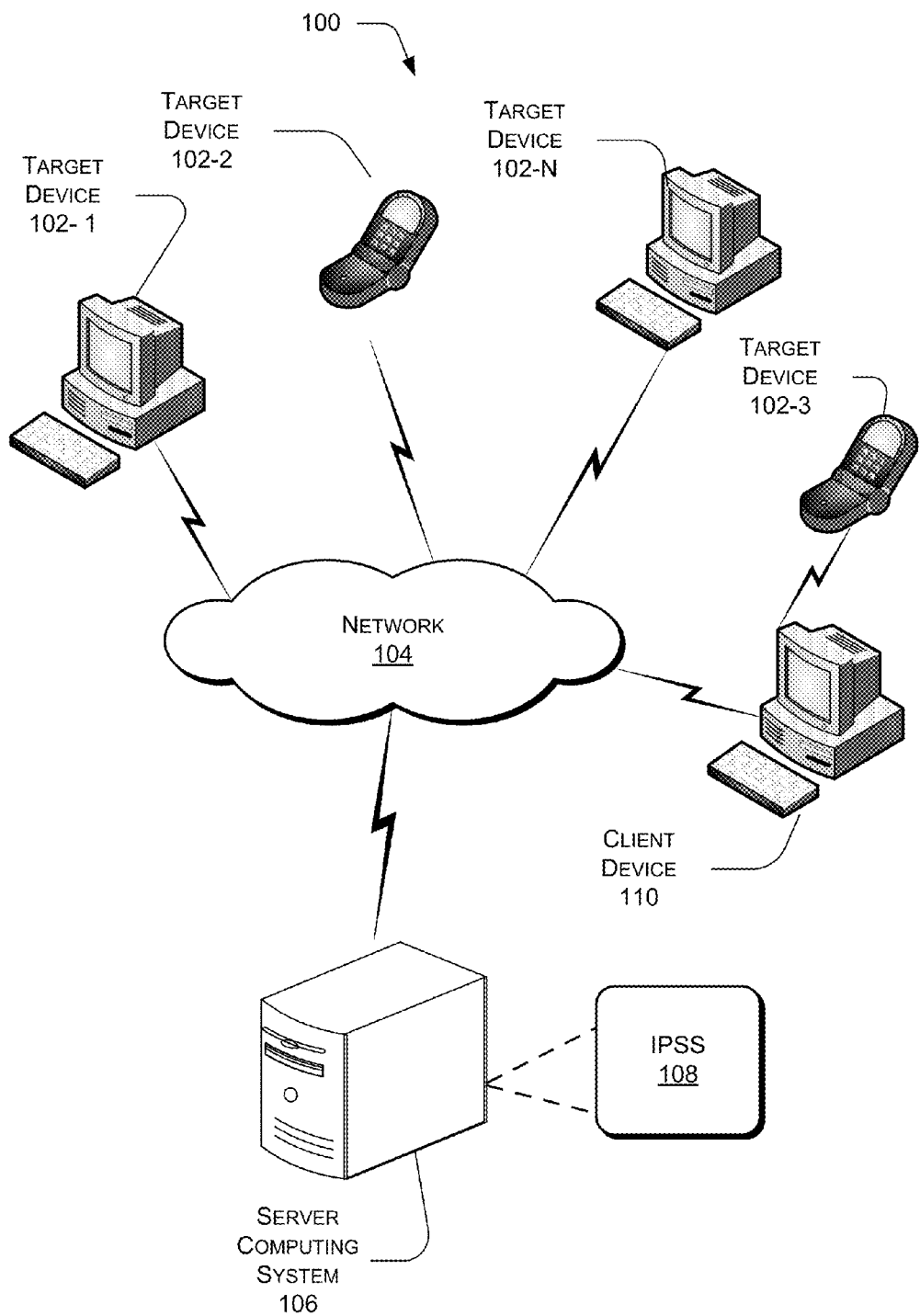
FIG. 1 illustrates an exemplary network diagram for communication between target devices and a server

FIG. 1 shows an exemplary system 100 for a network based application. The system 100 includes one or more target devices 102-1, 102-2, 102-3 . . . 102-N, hereinafter called as target device 102 that can communicate via a network 104.

The target device 102 is an electronic device undergoing personalization, and may be implemented in any number of ways including, for example, as general purpose computing devices, iPhones, PDAs, desktops, laptops, mobile computing devices, GPS-equipped devices, media players, etc. The network 104 may include, but is not limited to, a Local Area Network (LAN), a Wide Area Network (WAN), and a Metropolitan Area Network (MAN). Further, the network 104 is representative of a wireless network, a wired network, or a combination thereof.

In an exemplary implementation, the target device 102 interacts with a server computing system 106 via the network 104. The server computing device 106 may also be implemented in many ways including, for example, as a stand alone general purpose computing device or mainframe, or as a cluster of servers (e.g., arranged in a server farm). The server computing system 106 includes an image personalization system and service (IPSS) 108.

The IPSS 108 provides one or more user interfaces that allow a user (such as a device owner) to register the target device 102 uniquely, and to download a personalized image onto the registered target device 102. The personalized image includes lost and found information for reporting and locating a found device. In one embodiment, the IPSS 108 is a network-based application, such as a web service, accessible via a client application, such as a web browser, which offers personalization, theft deterrence, and lost and found capabilities.

In another implementation, a client device 110, such as a personal computer can be used as an interface between a target device, such as the target device 102-3 and the IPSS 108 of the server computing system 106. In one embodiment, the target device (electronic device) 102-3 undergoing personalization is directly connected to the client device 110 for downloading images. In other embodiments, the target device 102-3 may be connected to the network 104 such that the target device 102-3 can communicate with the IPSS 108 via the client device 110.

In operation, an owner of a target device 102, such as the target device 102-1, can register themselves and the target device 102-1 with the IPSS 108 of the server computing system 106. For this, the owner can first register through an application, such as a web service or via telecommunication to obtain a unique identifier ID associated with the owner and/or the target device 102-1. On registration, the owner can access the services provided by the IPSS 108 to personalize the target device 102-1. As mentioned earlier, for personalization, the target device 102-1 can communicate with the IPSS 108 either directly or via the client device 110.

In one implementation, to personalize the target device 102-1, the IPSS 108 can be used to download an enhanced image data object (or enhanced digital image) onto the target device 102-1. The enhanced image includes embedded tracking information, such as a uniform resource locator (URL) or a uniform resource identifier (URI), etc. that can be used to track the target device 102-1 and the owner in case the target device 102-1 gets lost or stolen.

The enhanced image may be formed from an image present in the server computing system 106 or in an external memory source. The image is first enhanced by the IPSS 108 to include the tracking (lost and found) information. The enhanced image can be then downloaded onto the target device 102-1 using for example, a USB interface of the target device 102-1. Thus, the enhanced image may be displayed on the target device 102-1, for example, as a wallpaper, start-up screen, information screen, etc. or when a user powers-on the device.

In another implementation, the enhanced image may be formed from an image stored on the client or target device 102-1. In such a case, the IPSS 108 can include the tracking information with the image on the target device 102-1.

In yet another implementation, the tracking information may be provided to the target device 102-1 as a text data object downloaded from the IPSS 108. The text data object can be used to render the tracking information as a text overlay with or without an image, when a user powers-on the target device 102-1 or as a wallpaper, start-up screen, information screen, etc. The text data object can also include text entered by the owner through a user interface of the target device 102-1.

The enhanced image and/or text data object that contain the tracking information can be made access protected so that a finder can not change the information without authentication. For example, the enhanced image can be write-protected or can be downloaded in such a manner that the target device 102-1 treats the downloaded image as write protected using inherent capabilities of the target device 102-1. Other features of the target device 102-1, such as keypad locking mechanisms can also be used for access protection. These and other combinations for access protection known in the art can be used to protect the image. Similar mechanisms can be used to protect the text data object also. Further, the data object can be so formatted that the time required to upload and/or store the data object is optimized with respect to the security features and information provided.

In case the target device 102-1 gets lost and is found by a finder, the finder can notify with the IPSS 108 using the tracking information. The IPSS 108 can communicate details of the finder to the owner so that the lost device can be returned to the owner. Additionally a reward can be given to the finder. In another case, if an unauthorized user tries to use the target device 102-1, the IPSS 108 can be notified automatically by the target device 102-1, and the owner can be informed of the attempted breach of the target device 102-1.

Figure 2:
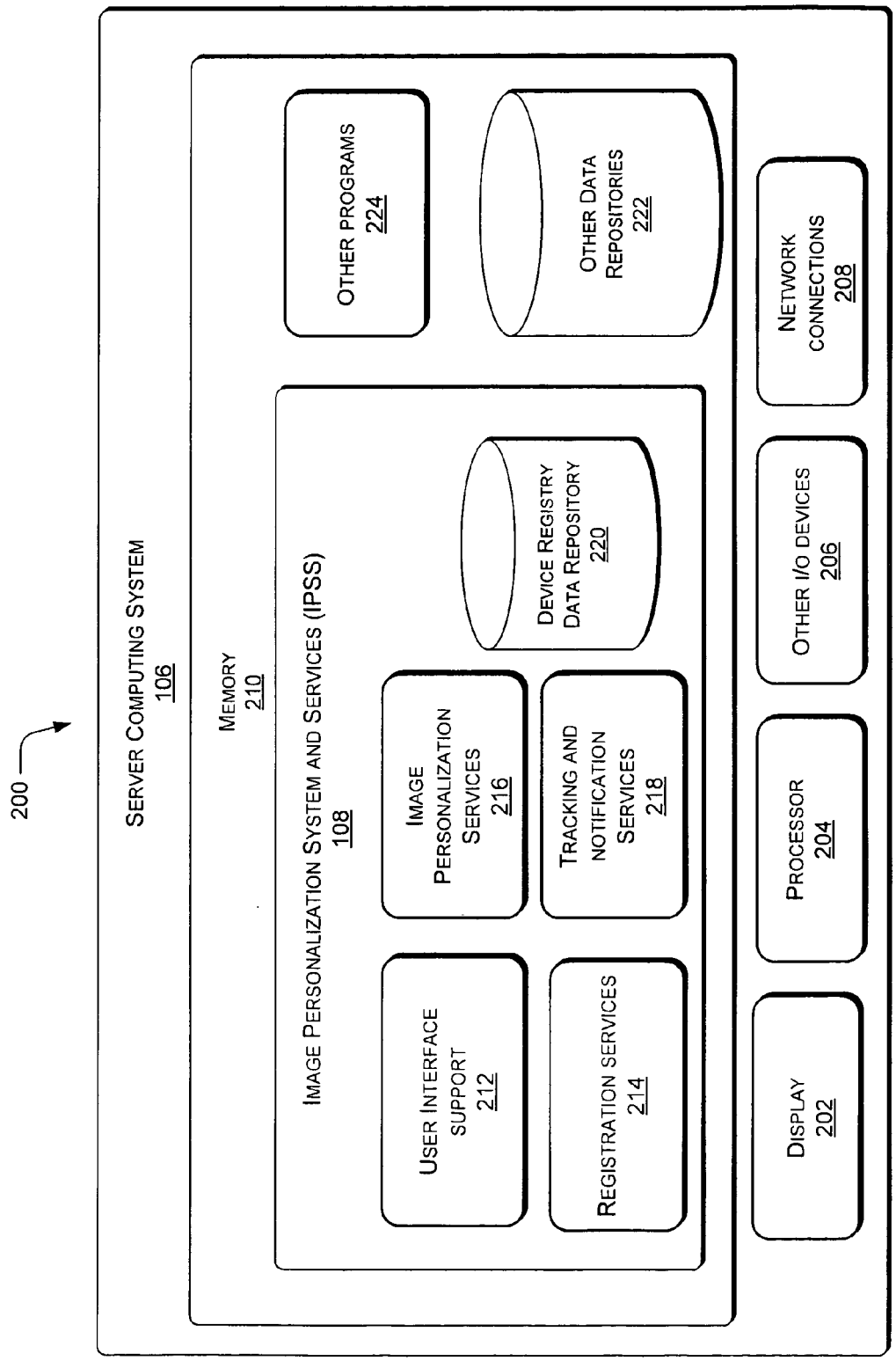
FIG. 2 illustrates an exemplary block diagram for a server computing system that includes an Image Personalization System and Service (IPSS).

FIG. 2 illustrates an exemplary system diagram 200 of a general purpose computer system, such as a server computing system 106, for an Image Personalization System and Services. The system 200 includes one or more functional components/modules that work together to provide personalized images, theft deterrence, and lost and found tracking services.

The exemplary system diagram 200 shows the server computing system 106 that includes a display 202, one or more processors (such as a Central Processing Unit or CPU) 204, other I/O devices (e.g., keyboard, mouse, etc.) 206, network interfaces 208 and a memory 210. The network interfaces 208 provide connectivity to a wide variety of networks, such as the network 104, and protocol types such as wire networks (e.g., LAN, cable, etc.) and wireless networks (e.g., WLAN, cellular, satellite, etc.). The memory 210 can be any computer-readable media in the form of volatile memory, such as Random Access Memory (RAM) and/or non-volatile memory, such as Read Only Memory (ROM) or flash RAM.

The memory 210 includes an Image Personalization System and Services (IPSS) 108. The various blocks of the IPSS 108 may physically reside on one or more machines, which use standard (e.g., TCP/IP) or proprietary inter-process communication mechanisms to communicate with each other. In a typical embodiment, the IPSS 108 includes one or more user interface support modules 212, one or more registration services 214, one or more image personalization services 216, one or more tracking and notification services 218, and a device registry data repository 220. Further, the memory 210 can include other data repositories such as data repository 222, and other downloaded code or programs 224 such as an OS, etc. The various memory components preferably execute on one or more of the processors 204.

In an exemplary implementation, components/modules of the IPSS 108 are implemented using standard programming techniques. However, a range of programming languages known in the art may be employed including representative implementations of various programming language paradigms including, but not limited to, object-oriented (e.g., Java, C++, C#, Smalltalk), functional (e.g., ML, Lisp, Scheme, etc.), procedural (e.g., C, Pascal, Ada, Modula), scripting (e.g., Perl, Ruby, Python, etc.), etc.

In one embodiment, the IPSS 108 may be implemented in a distributed environment that is comprised of multiple, even heterogeneous computer systems and networks. For example, in one embodiment, the image personalization services 216, the tracking and notification services 218, and the device registry data repository 220 can be all located in physically different computer systems. In another embodiment, various components of the IPSS 108 can each be hosted on a separate server machine and may be remotely located from tables which are stored in the device and user data such as that stored in the device registry data repository 220. Also, one or more of the components may themselves be distributed, pooled or otherwise grouped so as to provide load balancing, reliability, and security.

Different configurations and locations of programs and data are contemplated for use with techniques described herein. In one embodiment, a variety of distributed computing techniques are appropriate for implementing the components of the illustrated embodiments in a distributed manner including, but not limited to, TCP/IP sockets, RPC, RMI, HTTP, Web Services (XML-RPC, JAX-RPC, SOAP, etc.). In another embodiment, other variations are possible.

The device registry data repository 220 stores programming interfaces to the data stored as part of the IPSS 108 implementation process. The programming interfaces can be available by standard means such as through C, C++, C#, and Java APIs; libraries for accessing files, databases, or other data repositories; through scripting languages such as XML; or through Web servers, FTP servers, or other types of servers providing access to stored data. The device registry data repository 220 may be implemented as one or more database systems, file systems, or any other method known in the art for storing such information, or any combination of the above, including implementation using distributed computing techniques.

Exemplary IPSS System—"MyFoundCast"

In one embodiment, the IPSS 108 may be implemented as a service referred to as MyFoundCast. Thus MyFoundCast is an exemplary service designed for an owner of an electronic device, such as the target device 102, who wants to personalize his or her device to deter others from stealing it or recover his or her device when it is lost. The device owner or someone on the owner's behalf can create an account by registering online, such as with the registration services 214, using a MyFoundCast website or by telephonic communication with a MyFoundCast representative. Once the owner has registered the device, the owner has access to the MyFoundCast services which includes a personalization service provided by the image personalization services 216, a lost and found service provided by the tracking and notification services 218, and a theft deterrent service also provided by the image personalization services 216.

The personalization service provided by the image personalization services 216 allows an owner to select digital images from a variety of sources and automatically convert them to a format supported by the device. Further, tracking information can be provided by the MyFoundCast website to the device in the form of a data object and/or the image that is downloaded to the device and has the information visibly superimposed on it. The image can be displayed as a start up screen, wallpaper, an information screen or a photo, etc. The information in the data object can be extracted and rendered by the device with or without an image. The tracking information may include, for example, a URL and/or a phone number that is associated with the MyFoundCast website and identifying information, such as a unique identifier and/or a serial number associated with the device and/or the owner, or some other type of identification.

The lost and found service provided by the tracking and notification services 218 provides a way for an owner to retrieve a device when it is lost or misplaced. This service operates by providing a way for the device to render lost and found information on its display that can be seen and used by a finder of the lost device to report that the device has been found. When a finder sees instructions on the found device to visit a URL (or any other identifier of the MyFoundCast website) or call a phone number, the finder can visit the site or call the number and provide the displayed unique identifying information or the serial number of the found device to the operator. The site provides a link where the finder can input the unique identifying information and the finder's contact information. Once the finder submits this information to the MyFoundCast website, a notification such as an email is sent to the owner and a message is presented to the owner when the owner signs into his or her MyFoundCast account.

An owner, after having the finder's contact information, can make arrangements to retrieve the device. Optionally, MyFoundCast can be used to provide rewards to the finder. In one embodiment, the owner can register a reward which is displayed to the finder when they report the device. In another embodiment, the owner can specify a reward when they contact the finder or a reward can be provided at some other time.

The theft Deterrent service also provided by the image personalization services 216, provides a way to write protect the personalized image and lost and found information on the device so that only the registered owner of the device or any other person registered as associated with the owner can overwrite or modify the information. For example, if the owner transfers and write-protects an image that is a self portrait, a thief or other unauthorized individual would see the self portrait of the owner every time he or she turns on the device and would not be able to change it. In some cases, this may act as an annoyance factor and a strong deterrent.

Exemplary Methods

Figure 3:
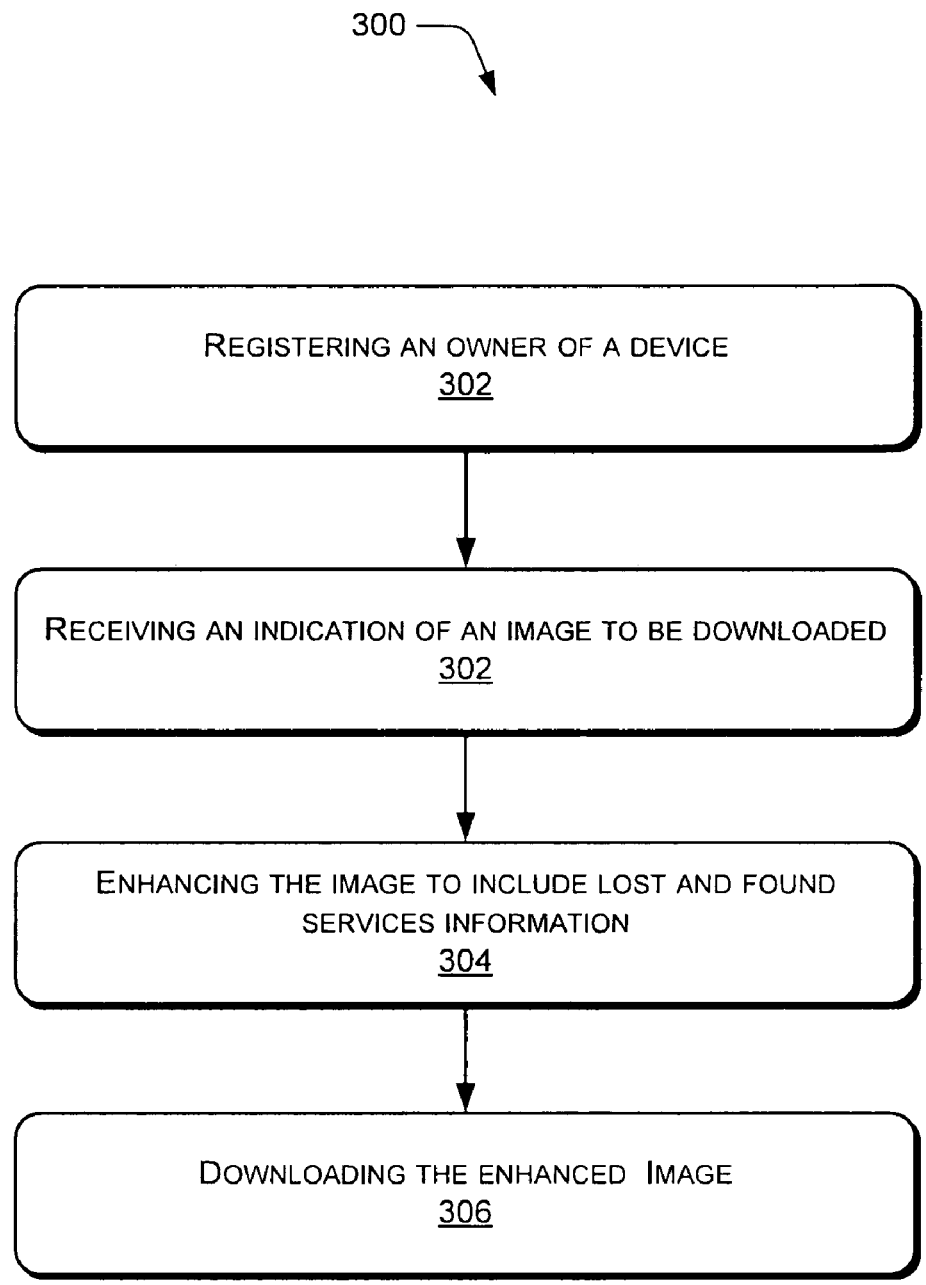
FIG. 3 illustrates an exemplary method for device personalization.

FIG. 3 illustrates an exemplary method 300 for personalizing an electronic device such that device can be returned when found. The order in which the method is described is not intended to be construed as a limitation, and any number of the described method blocks can be combined in any order to implement the method, or an alternative method.

At block 302, a device owner is registered with an image personalization system and service (IPSS). For example, an owner of a target device 102 can be registered with the IPSS 108 in the server computing device 106. The owner of the device gets registered by providing contact information to the IPSS 108 via for example a website. This information of the owner is stored in a database at the server computing system 106. In one embodiment, it is possible to register via telephone and not necessarily through the website interface. In such a case, an operator would enter the information into the system for the owner using an application interface.

At block 304, it is determined whether an enhanced image is to be used to provide lost and found information. For this, the IPSS 108 may provide an option to the registered owner to choose between using an enhanced image or a text data object. If the owner selects the enhanced image, then the method proceeds from block 306 (i.e. the "yes" branch from block 304) through to block 310. Else, if the owner selects the text data object, the method proceeds from block 312 (i.e. the "no" branch from block 304) through to block 314.

At block 306, an indication of an image that is to be downloaded to the device is received by the IPSS. For example, the owner can select an image from different image options provided by the IPSS 108. Further, the owner can be presented with options on whether or not the owner would like to add lost and found information and a title to the image and write protect the image so that only the owner can overwrite or modify the image. The owner can also be presented with an option of changing an existing image. Thereafter, an indication of selected image (that is to be downloaded) is received by the IPSS 108.

At block 308, the selected image is enhanced to create an image data object to include the lost and found services information that specifies a location/number to contact if the device is found. The image is enhanced by embedding in it sufficient tracking information to later report about the device if it is found. Such embedding may be accomplished by superimposing a uniform resource identifier ("URI") or a uniform resource locator ("URL") directly onto the image.

At block 310, the image data object (or enhanced image) is downloaded onto the device such that the enhanced image appears every time the device is powered on. The enhanced image is loaded onto the device by using, for example, the communication interfaces available on the device such as a USB port. Depending upon the device, the enhanced image may be displayed, for example, as wallpaper, a start-up screen or an information screen, etc. The enhanced image can be displayed when the user powers-on the device or at other times, such as when the device is idle.

Access protection, such as write-protection, for the enhanced image may be provided by the IPSS 108 in several ways. The IPSS 108 may download an enhanced image that is access-protected and indicate to the device that it is access-protected. In one embodiment, the IPSS 108 may cause the enhanced image to be downloaded in such a manner that the target device 102 treats it as a write protected image using the inherent capabilities of the device. For example, some phones do not allow images that are installed as wallpapers to be overwritten by unauthorized individuals. Other known mechanisms for providing access protection are also supported.

At block 312 (i.e. the "no" branch from block 304), a text data object is created that includes the lost and found information and title without an image.

At block 314, the text data object is downloaded to the target device 102, which renders the data object as a text overlay containing the tracking information. The text data object may be displayed over an image or over a blank screen.

Once the target device 102 is provided with the lost and found information from the IPSS 108, either as an image data object or as a text data object, the method 300 proceeds to block 316.

At block 316, it is determined at the device whether the downloaded image/text data object is valid. If the data object is not valid, for example, due to incompatible formatting or corrupt data, the data object is discarded at block 318. Then the method 300 may return to block 304 (return path not shown in figure). If the data object is determined to be valid, then the method 300 continues to block 320 from the yes branch of block 316.

At block 320, the data object is either stored in memory or discarded based on pre-specified criteria, such as whether it is the first time that the target device is receiving a data object, existing unique identifiers in the device memory, and existing access protection settings. For example, if it is the first time that the target device 102 is receiving a data object, then the data object can be stored in non-volatile memory of the target device 102. If it is not the first time, but the unique identifier of the data object is the same as that in memory, then the data object can still be stored in the memory.

Further, if it is not the first time and the unique identifier of the data object is not the same as that in memory, but the previous data object does not have access protection (write protection) settings turned on, then also the data object can be stored in the memory. However, if it is not the first time, the unique identifier of the data object is not the same as that in memory, and the previous data object has access protection (write protection) settings turned on, then the data object is discarded. Then the method 300 may return to block 304 (return path not shown in figure).

Figure 4:
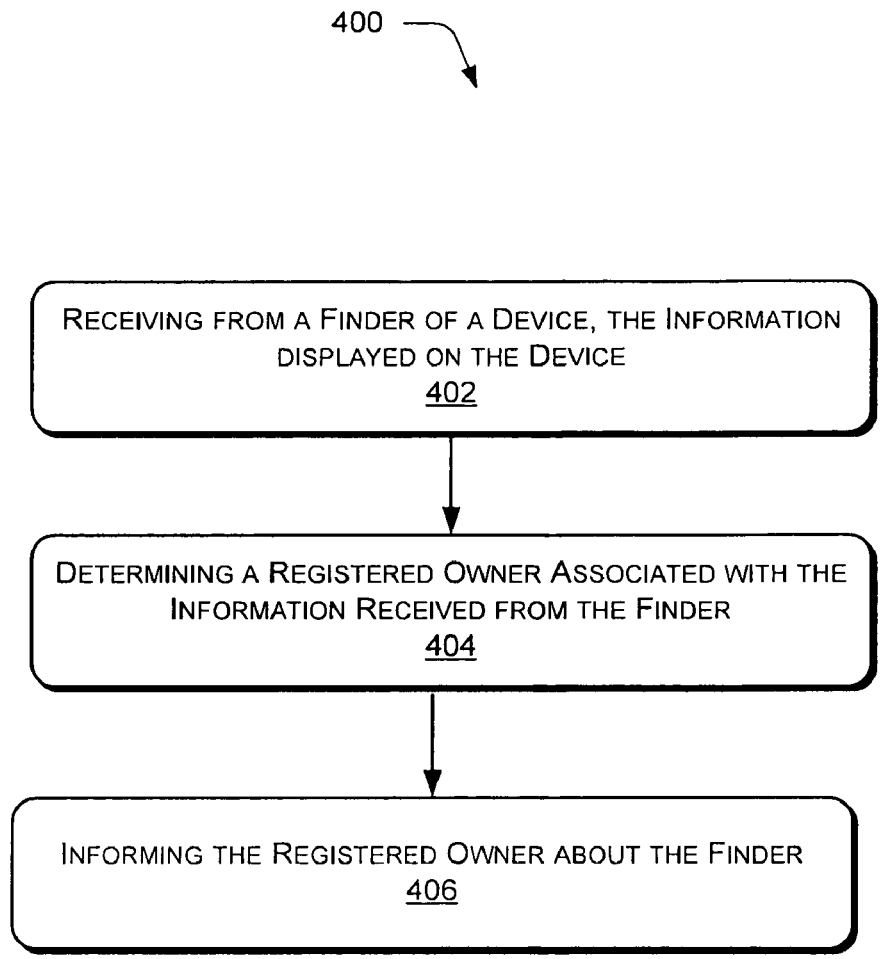
FIG. 4 illustrates an exemplary method for identification of a lost device.

FIG. 4 illustrates an exemplary method 400 for identification of lost devices. The order in which the method is described is not intended to be construed as a limitation, and any number of the described method blocks can be combined in any order to implement the method, or an alternative method.

At block 402, information regarding a lost device is received from a finder. For example, the finder, on finding the device, can observe a unique identifier or serial number and a URL of the IPSS 108 website or a contact phone number, and can visit the website or call the number. The IPSS 108 thus receives information identified by the finder, for example information that is digitally displayed by rendering a data object (either digital image or text) on the display screen of the lost device.

In one embodiment, if the identified information includes a URL of the website, then the finder goes to the website and enters the unique identifier or serial number. The finder enters their contact information such as an email address and a message for the owner. In another embodiment, if the identified information is a phone number, then the finder calls the phone number and gives the unique identifier or serial number to an operator. Thereafter, the operator enters the finder's email address and a message for the owner into the website.

At block 404, a registered owner associated with the information received from the finder is determined. The received information includes a unique identification number or device serial number. This information is helpful in locating the owner of the found device.

At block 406, the registered owner is informed about the finder. Finder's details including an email, containing the finder's email address and a message for the owner is sent to the owner through the IPSS 108, such as through a personal area provided by the IPSS 108 to the owner. This personal area is allocated to the owner of the lost device when the owner gets registered with the service (IPSS). The finder's email and message for the owner is entered into a database and is accessible to the owner when they log into the website. The information remains accessible until the owner indicates that the device is back in his or her possession. Through this information, the owner can make arrangements with the finder to retrieve the device and optionally reward the finder.

CONCLUSION

The above described methods and systems relate to device personalization. Although the subject matter has been described in language specific to structural features and/or methodological acts, it is to be understood that the invention defined in the appended claim is not necessarily limited to the specific features or acts described. Rather, the specific features and acts are disclosed as exemplary forms of implementing the claimed subject matter.

What is claimed is:

1. A computer implemented method for personalizing an electronic device comprising:
   registering an owner of the device;
   determining a type of a data object to be downloaded onto the device;
   determining whether the data object to be downloaded is an enhanced image or a text data object;
   creating the data object of the determined type, wherein the data object of the enhanced image type is created by enhancing an image, wherein the enhancing the image comprises superimposing a lost and found information onto the image such that the information becomes embedded in the image, and wherein the data object includes the lost and found services information that specifies a location to contact if the device is found; and
   downloading the data object onto the device to personalize the device.

2. The method of claim 1, wherein the device is a mobile communication device, a portable data management device, a watch, a camera, a cell phone, or a media player.

3. The method of claim 1, wherein the lost and found information indicates an address of a website to connect to when the device is found.

4. The method of claim 1, wherein the lost and found information indicates a phone number to call at when the device is found.

5. The method of claim 1, further comprising registering the device.

6. The method of claim 1, further comprising protecting the data object from unauthorized writing such that the data object once downloaded onto the device can be replaced only on authorization by the registered owner.

7. The method of claim 1, wherein the downloading is done such that the data object is rendered on the device as a wallpaper, an information screen, a screen saver, or a keypad lockout screen.

8. A system comprising:
   a processor;
   a memory coupled to the processor;
   a registration service that is configured to register a device and an owner of the device with the system;
   an image personalization services component configured to:
      determine a type of a data object to be downloaded onto the device;
      determine whether the data object to be downloaded is an enhanced image or a text data object; and
      enhance a digital image for the device such that the enhanced image includes lost and found information superimposed onto the digital image such that the lost and found information becomes embedded in the image, wherein the lost and found information specifies a location to contact if the device is found; and
   a lost and found tracking service component that is configured to:
      receive from a finder a report of a found device based on the lost and found information associated with the found device; and
      relay an alert to a registered owner of the found device.

9. The system of claim 8, wherein the lost and found tracking service component is further configured to provide contact information of the finder to the registered owner.

10. The system of claim 8, wherein the lost and found information includes a link to a website.

11. The system of claim 8, wherein the lost and found information includes a telephone number or a physical address.

12. The system of claim 8, wherein the formatted image is write-protected such that only the registered owner can change the image once downloaded to the device.

13. The system of claim 8, wherein the image is formatted to enable a finder to report a device when found.

14. A method in a computing system, comprising:
   receivin g identifying information from a finder of a lost or stolen device, wherein the identifying information comprises information displayed on a display screen of the lost or stolen device, wherein the identifying information displayed on a display screen of the lost or stolen device is a downloaded and enhanced image which superimposes a lost and found information onto an image such that an identifying information becomes embedded in the image, and wherein the lost and found information specifies a location to contact if the device is found;
   receiving information associated with the finder;
   determining a registered owner associated with the received identifying information; and
   providing the registered owner with the information associated with the finder.

15. The method of claim 14, wherein the identifying information further includes at least one of a unique identification number or a device serial number.

16. The method of claim 14, further comprising informing the finder of a reward in return for the identifying information.

* * * * *